Feb. 18, 1947. J. B. PARSONS 2,416,118
GUIDE DEVICE FOR VEHICLE DOORS
Filed Jan. 3, 1944
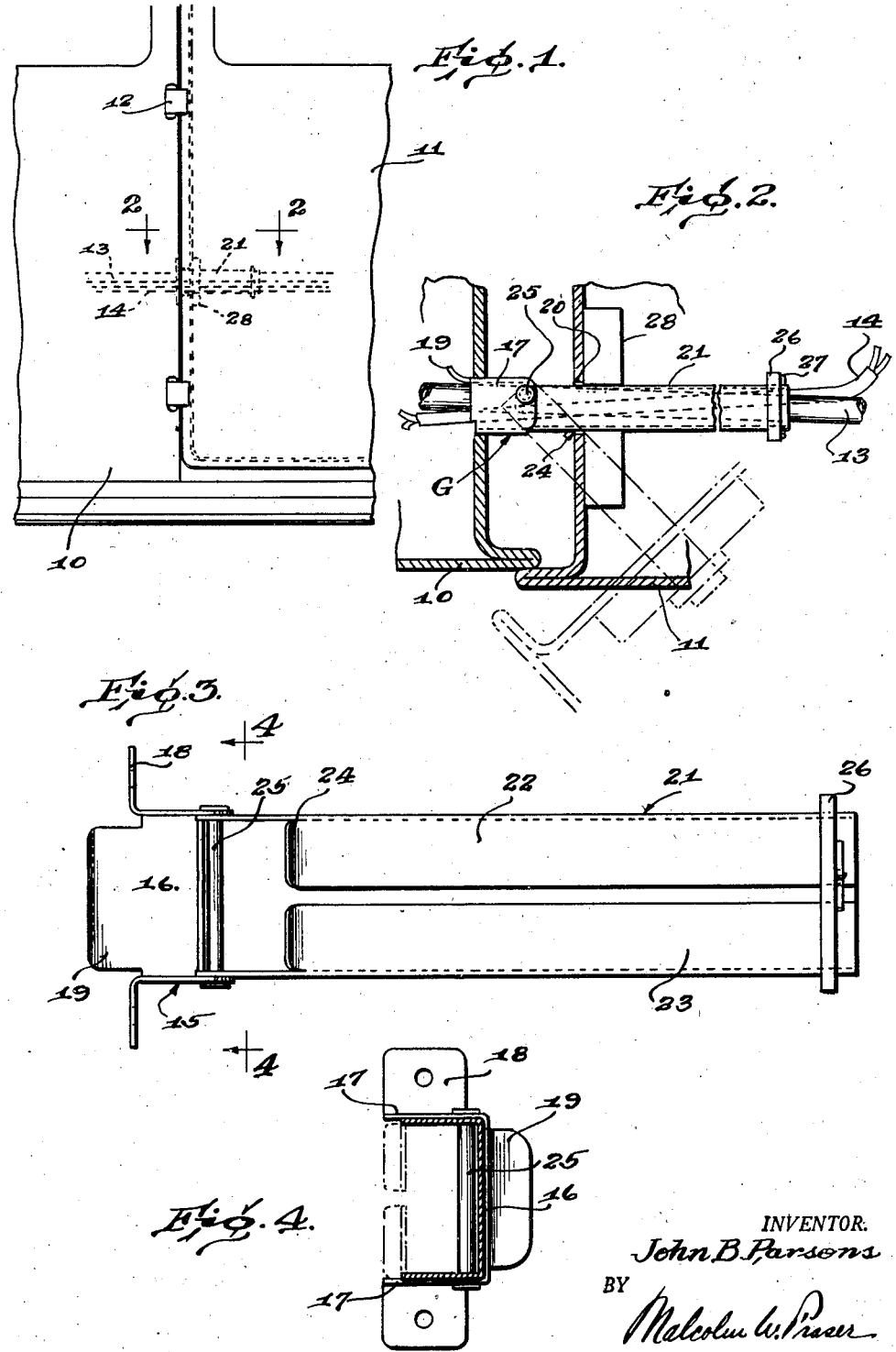
INVENTOR.
John B. Parsons
BY
Malcolm W. Fraser
ATTORNEY Patented Feb. 18, 1947

2,416,118

UNITED STATES PATENT OFFICE 2,416,118

GUIDE DEVICE FOR VEHICLE DOORS

John B. Parsons, Toledo, Ohio

Application January 3, 1944, Serial No. 516,889

2 Claims. (Cl. 296—44)

This invention relates to a guide or holder for flexible conduits such, for example, as rubber hose or electric cord leading from a vehicle body to the inside of a hingedly mounted door on the body, and an object is to produce a simple and efficient device of this character which can be inexpensively manufactured, is simple to install and satisfactorily holds flexible conduits of the above character without damage or injury thereto as a consequence of the door opening and closing movements.

In one aspect the invention is adapted for vehicle doors equipped with hydraulic regulator mechanisms by which the window panel is automatically actuated in one direction or the other, motive power being provided by a hydraulic piston and cylinder assembly, there being, for example, a solenoid controlled valve for trapping the liquid to hold the parts in position of adjustment. Such hydraulic device is installed within the vehicle door and to it lead from the vehicle body a flexible tube or hose and electrical wiring. Not only is it desirable that such flexible conduits be concealed from view when the door is opened, but also that they be adequately protected from chafing or abrasions or other injury resulting from swinging movements of the door.

Other objects and advantages of the invention will hereinafter appear and for purposes of illustration but not of limitation, an embodiment of the invention is shown in the accompanying drawing in which Figure 1 is a fragmentary side elevation of a portion of a vehicle body showing the hingedly mounted door and indicated by broken lines the flexible conduit guide and holder;

Figure 2 is an enlarged sectional view on the line 2—2 of Figure 1;

Figure 3 is an enlarged view of the conduit guide and holder removed from the vehicle body; and Figure 4 is a transverse sectional view on the line 4—4 of Figure 3.

The illustrated embodiment of the invention comprises a vehicle body 10, such, for example, as an automobile body having a door 11 secured to the body by the usual hinges 12. In order to conduct flexible conduits from the body 10 to the inside of the door 11, a holder and guide G is provided, the same having a part secured to the body and another part projecting through an opening in the side of the door to the inside thereof. In this instance, the flexible conduit is in the form of a flexible tube 13 and an electrical cord 14.

The guide G is composed of two sheet metal stampings, a bracket 15 and an elongate tubular guide. The bracket 15 is a one-piece sheet metal stamping having a body wall or panel 16 and side walls 17 projecting at right angles to the body wall and attaching wings 18 which extend at right angles to the walls 17. The bracket 15 is secured to the vehicle body 10 adjacent the door 11 substantially as shown. An opening through the body panel admits the conduits 13 and 14 and projecting inside of the opening is a laterally curved lip or tongue 19 over which the flexible conduits may readily be passed without danger of abrasion or injury.

The door 11 is formed with an opening 20 through which the tubular guide 21 may freely slide. The guide 21 is a one-piece sheet metal stamping substantially rectangular in cross section and formed by bending a strip of metal upwardly and thence inwardly, the solid body panel being indicated at 22, and the free edge portions being indicated at 23 with the free edges spaced slightly from each other. The inner ends of each wall portion 23 terminate in outwardly curved lips 24 thereby providing surfaces over which the flexible conduits may slide without liability of injury. The extreme inner end of the body panel 22 of the elongate guide 21 is curled inwardly to embrace a rivet 25 which extends through apertures in the side walls of the conduit 21 as well as in the side walls 17 of the bracket 15. In this manner the elongate guide 21 is pivotally connected to the bracket 15.

From the above description it will be manifest that in the opening and closing movements of the door 11 the elongate guide 21 freely slides through the opening 20 and although the conduits disposed therein are flexed during such movement, they are retained in the desired position and liability of their being cut or otherwise injured is eliminated. Furthermore, it will be understood that the flexible conduits are concealed from view when the door is opened since they are contained within the guide 21 and bracket 15 which cover them. This arrangement is also of advantage in protecting the conduits from the elements.

Mounted on the outer end of the elongate guide 21 is a washer 26 which is retained in place by a cotter pin 27 extending through the end portion of the guide. When the door 11 is swung to its open position, the washer 26 abuts a resilient rubber cushion 28 thereby serving as a check. In this manner it will be manifest that the device not only serves as a flexible conduit guide and holder, but also provides a door check.

It is to be understood that numerous changes in details of construction, arrangement and operation may be effected without departing from the spirit of the invention especially as defined in the appended claims.

What I claim is:

1. A device for guiding flexible conduits from a vehicle body into a door section hingedly mounted thereon, said device comprising an element formed from a sheet metal stamping into a member channel shaped in transverse section having the vertical edge wall section curved outwardly to militate against injury to the included conduits and the top and bottom horizontal edges upturned and downturned respectively for body attachment, an elongate sleeve member formed from a sheet metal stamping into a member substantially rectangular in transverse section having the end wall section of one vertical side cut away and curved for militating against conduit injury, a pivotal connection between the end section of said channel member and the cut away end of the sleeve section, and an aperture in the end wall of the vehicle door for sliding movement of the sleeve member projecting therethrough.

2. A device for guiding flexible conduits from a vehicle body into a door section hingedly mounted thereon which device also operates as a door check, said device comprising a member of channel shape in transverse section having the vertical side wall curved outwardly and edge portions of the top and bottom horizontal faces respectively upturned and downturned forming flanges for body attachment, an elongate sleeve member rectangular in transverse section, a pivotal connection between the open end portions of the channel member and said sleeve member permitting the extension of flexible conduits therethrough, an aperture in the hinged end wall section of said door permitting sliding movement of the sleeve section projecting therethrough, and a resilient flange on the end portion of said sleeve member for abutment against the door end wall when said door is fully opened thereby to provide a check.

JOHN B. PARSONS.

REFERENCES CITED

The following references are of record in the file of this patent:

UNITED STATES PATENTS

| Number | Name | Date |
|---|---|---|
| 2,187,936 | Craig | Jan. 23, 1940 |
| 2,335,696 | Rappl et al. | Nov. 30, 1943 |
| 2,115,811 | Hansen | May 3, 1938 |
| 2,160,895 | Nicholson | June 6, 1939 |
| 2,104,124 | Haberstump | Jan. 4, 1938 |
| 1,910,883 | Caroselli | May 23, 1933 |